US007054900B1

(12) United States Patent
Goldston

(10) Patent No.: US 7,054,900 B1
(45) Date of Patent: May 30, 2006

(54) AUTOMATIC, PROFILE-FREE WEB PAGE RECOMMENDATION

(75) Inventor: Mark Goldston, Beverly Hills, CA (US)

(73) Assignee: NetZero, Inc., Woodland Hills, CA (US)

( * ) Notice: Subject to any disclaimer, the term of this patent is extended or adjusted under 35 U.S.C. 154(b) by 833 days.

(21) Appl. No.: 09/718,604

(22) Filed: Nov. 20, 2000

Related U.S. Application Data

(60) Provisional application No. 60/226,341, filed on Aug. 18, 2000.

(51) Int. Cl.
G06F 15/16 (2006.01)

(52) U.S. Cl. ........................................ 709/203; 709/217

(58) Field of Classification Search ................ 709/233, 709/238, 245, 225, 203, 217; 345/736, 853; 705/14; 707/7
See application file for complete search history.

(56) References Cited

U.S. PATENT DOCUMENTS

| | | | |
|---|---|---|---|
| 4,799,156 A | 1/1989 | Shavit | |
| 5,105,184 A | 4/1992 | Pirani | |
| 5,253,165 A | 10/1993 | Leiseca | |
| 5,493,491 A | 2/1996 | Calcerano | |
| 5,504,675 A | 4/1996 | Cragun | |
| 5,636,346 A | 6/1997 | Saxe | |
| 5,715,402 A | 2/1998 | Popolo | |
| 5,717,860 A | 2/1998 | Graber | |
| 5,717,923 A | 2/1998 | Dedrick | |
| 5,721,827 A | 2/1998 | Logan | |
| 5,724,424 A | 3/1998 | Gifford | |
| 5,740,549 A | 4/1998 | Reilly | |
| 5,761,662 A | 6/1998 | Dasan | |
| 5,768,521 A | 6/1998 | Dedrick | |
| 5,794,207 A | 8/1998 | Walker | |
| 5,794,210 A | 8/1998 | Goldhaber | |
| 5,835,716 A | 11/1998 | Hunt | |

(Continued)

FOREIGN PATENT DOCUMENTS

WO WO 97/41673 11/1997

(Continued)

OTHER PUBLICATIONS

Armstrong, WebWatcher: A Learning Apprentice for the World Wide Web, Information Seeking Assistant, School of Computer Science Carnegie Mellon University, Feb. 1, 1995.

(Continued)

*Primary Examiner*—Andrew Caldwell
*Assistant Examiner*—Stephan Willett
(74) *Attorney, Agent, or Firm*—SoCal IP Law Group LLP; Steven C. Sereboff; Joel G. Landau

(57) ABSTRACT

An electronic content recommendation service is provided which can act as an aid to a user in obtaining electronic content. A user's browsing of electronic content is monitored. For each unit of electronic content output by the user's browser, one or more units of electronic content (e.g., web pages) are recommended to the user. The user may then load a recommended unit of electronic content. Recommendation is based upon a system of categorization. A number of units of electronic content are identified as fitting into predefined categories of human interest. During a user's browsing, the unit of electronic content loaded in the user's browser is determined to be in at least one of the predefined categories. Recommendations of electronic content to browse are drawn from lists of units of electronic content which were previously placed into the category of the current unit of electronic content.

37 Claims, 4 Drawing Sheets

U.S. PATENT DOCUMENTS

| | | | |
|---|---|---|---|
| 5,835,896 A | | 11/1998 | Fisher |
| 5,845,265 A | | 12/1998 | Woolston |
| 5,848,396 A | * | 12/1998 | Gerace |
| 5,878,223 A | * | 3/1999 | Becker et al. ............... 709/223 |
| 5,897,620 A | | 4/1999 | Walker |
| 5,905,975 A | | 5/1999 | Ausubel |
| 5,909,589 A | * | 6/1999 | Parker et al. ................. 712/32 |
| 5,913,040 A | | 6/1999 | Rakavy |
| 5,918,014 A | | 6/1999 | Robinson |
| 5,933,811 A | | 8/1999 | Angles |
| 5,948,061 A | | 9/1999 | Merriman |
| 5,950,178 A | | 9/1999 | Borgato |
| 5,959,623 A | | 9/1999 | van Hoff |
| 5,966,699 A | | 10/1999 | Zandi |
| 5,974,395 A | | 10/1999 | Bellini |
| 5,995,950 A | | 11/1999 | Barns-Slavin |
| 6,006,201 A | | 12/1999 | Berent |
| 6,009,410 A | * | 12/1999 | LeMole et al. ............... 705/14 |
| 6,012,045 A | | 1/2000 | Barzilai |
| 6,021,398 A | | 2/2000 | Ausubel |
| 6,026,368 A | | 2/2000 | Brown |
| 6,035,289 A | | 3/2000 | Chou |
| 6,044,376 A | * | 3/2000 | Kurtzman, II |
| 6,055,513 A | | 4/2000 | Katz |
| 6,058,379 A | | 5/2000 | Odom |
| 6,064,981 A | | 5/2000 | Barni |
| 6,085,229 A | | 7/2000 | Newman |
| 6,101,482 A | | 8/2000 | DiAngelo |
| 6,112,186 A | | 8/2000 | Bergh et al. |
| 6,119,098 A | * | 9/2000 | Guyot et al. .................. 705/14 |
| 6,119,164 A | * | 9/2000 | Basche |
| 6,141,010 A | * | 10/2000 | Hoyle ........................ 345/854 |
| 6,141,699 A | | 10/2000 | Luzzi |
| 6,144,944 A | * | 11/2000 | Kurtzman et al. ............ 705/14 |
| 6,151,600 A | | 11/2000 | Dedrick |
| 6,154,783 A | * | 11/2000 | Gilmour et al. ............ 709/245 |
| 6,205,432 B1 | * | 3/2001 | Gabbard et al. .............. 705/14 |
| 6,236,975 B1 | | 5/2001 | Boe |
| 6,237,022 B1 | | 5/2001 | Bruck |
| 6,269,393 B1 | * | 7/2001 | Yost et al. |
| 6,279,112 B1 | * | 8/2001 | O'Toole, Jr. et al. |
| 6,289,337 B1 | * | 9/2001 | Davies et al. .................. 707/7 |
| 6,324,538 B1 | * | 11/2001 | Wesinger, Jr. et al. |
| 6,327,571 B1 | | 12/2001 | Khayat |
| 6,338,066 B1 | * | 1/2002 | Martin et al. ................. 707/10 |
| 6,338,094 B1 | | 1/2002 | Scott |
| 6,345,289 B1 | * | 2/2002 | Lotspiech et al. .......... 709/203 |
| 6,366,298 B1 | * | 4/2002 | Haitsuka et al. ............ 345/736 |
| 6,366,956 B1 | * | 4/2002 | Krishnan .................... 709/223 |
| 6,374,237 B1 | * | 4/2002 | Reese ............................ 707/3 |
| 6,381,651 B1 | * | 4/2002 | Nishio et al. ............... 709/245 |
| 6,385,592 B1 | * | 5/2002 | Angles et al. ................. 705/14 |
| 6,389,469 B1 | | 5/2002 | Vekslar |
| 6,401,094 B1 | * | 6/2002 | Stemp et al. ................. 707/10 |
| 6,438,578 B1 | * | 8/2002 | Schmid et al. |
| 6,438,579 B1 | * | 8/2002 | Hosken ...................... 709/203 |
| 6,466,975 B1 | * | 10/2002 | Sterling ...................... 709/223 |
| 6,477,509 B1 | * | 11/2002 | Hammons et al. ............ 705/14 |
| 6,490,587 B1 | * | 12/2002 | Easty et al. ................... 707/10 |
| 6,505,202 B1 | * | 1/2003 | Mosquera et al. ............ 707/10 |
| 6,529,878 B1 | * | 3/2003 | De Rafael et al. ............ 705/14 |
| 6,539,375 B1 | * | 3/2003 | Kawasaki ...................... 707/5 |
| 6,567,786 B1 | * | 5/2003 | Bibelnieks et al. ........... 705/14 |
| 6,606,745 B1 | | 8/2003 | Maggio |
| 6,611,814 B1 | * | 8/2003 | Lee et al. |
| 6,615,247 B1 | * | 9/2003 | Murphy |
| 6,631,372 B1 | * | 10/2003 | Graham ......................... 707/5 |
| 6,647,425 B1 | * | 11/2003 | Chaddha .................... 709/233 |
| 6,671,736 B1 | * | 12/2003 | Virine et al. ................ 709/238 |
| 6,701,362 B1 | * | 3/2004 | Subramonian et al. ...... 709/224 |
| 6,769,019 B1 | * | 7/2004 | Ferguson .................... 709/219 |
| 6,839,680 B1 | * | 1/2005 | Liu et al. ...................... 705/10 |
| 2004/0039784 A1 | | 2/2004 | Jacobs |

FOREIGN PATENT DOCUMENTS

| | | |
|---|---|---|
| WO | WO 98/35300 | 8/1998 |
| WO | WO 00/26800 | 5/2000 |
| WO | WO 00/54201 | 9/2000 |
| WO | WO 00/75850 | 12/2000 |

OTHER PUBLICATIONS

Brajnik, A Shell for Developing Non-Monotonic User Modeling Systems, California Digital Library International Journal of Human-Computer Studies, vol. 40, No. 1, pp. 31-62, Jan. 1, 1994.

Lieberman, Letizia: An Agent that Assists Web Browsing, M.I.T. Media-Lab, Cambridge, MA, Aug. 1, 1995.

Loeb, Architecting Personalized Delivery of Multimedia Information, ACM Digital Library—Communications of the ACM, vol. 35, No. 12, pp. 39-50, Dec. 1, 1992.

Pazzani, Learning from hotlists and coldlists: Towards a WWW information filtering and Seeking agent, Dept. Information & Computer Science, UC Irvine, May 19, 1998.

Resnick, GroupLens: An Open Architecture for Collaborative Filtering of Netnews, ACM Digital Library—MIT Center for Coord. Science & University of Minnesota, pp. 175-186.

Shardanand, Social Information Filtering: Algorithms for Automating Word of Mouth, M.I.T. Media-Lab, Cambridge, MA, May 1, 1995.

\* cited by examiner

AUTOMATIC, PROFILE-FREE WEB PAGE RECOMMENDATION

RELATED APPLICATION INFORMATION

This application is related to and claims priority from U.S. Application No. 60/226,341, filed Aug. 18, 2000, entitled "Automated Internet Touring System Tailored To User-Specific Qualities," which is incorporated herein by reference.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to providing content of interest to a user. The present invention further relates to recommending web pages to a user of the World Wide Web based upon the currently viewed web page.

2. Description of Related Art

The World Wide Web is a collection of millions of linked web sites, electronic documents and files that are stored on computers throughout the world. The World Wide Web includes Web sites that literally relate to millions of different subjects, which may or may not be of interest to a person who is surfing the web.

A user typically employs a browser to access Web sites that are of interest to the user. The user can learn of Web sites of interest by either learning of the site through friends or through the media. Another way to learn of Web sites is to use a search engine to search the Web. The user typically types key words into a search engine Web page. The search engine then returns a list of one or more Web sites that relate to the keywords. This can be confusing for novice users who are unfamiliar with computers and the Web. Moreover, the use of search engines can also be frustrating for experienced users as the search engines may sometimes turn up sites that are unrelated to the keywords. Even worse, the search engines may sometimes inadvertently turn up sites that are of an objectionable nature to a particular user.

It would be desirable for a program or an online service to automatically assist a user with browsing to Web sites that are particularly tailored to the user's interests. This would allow novice user to quickly become accustomed to using the Web in a relatively easy manner. Such a program or service would also provide experienced users with a more fulfilling online experience.

Several attempts have been made at providing users with automated browsing assistance. In a system called "Ringo" developed at the MIT Media-Lab in the mid-1990s, personalized recommendations were made to a user based upon similarities between the interest profile of that user and the interest profiles of other users. Ringo was designed for making recommendations of music albums and artists, though it applied to Web browsing. In Ringo, he user profiles were developed by having the user rate content.

Other browsing aids, such as the eTour service of eTour, Inc., also depended on the development of user profiles. The quality of profile-based services depends on the extent and accuracy of each user's profile. Thus, in some services, a considerable number of users, providing considerable amount of ratings, are required before they become useful. Furthermore, profile-based services cannot easily account for changing tastes of the users. Finally, profile-based services face a considerable obstacle in that, before a user can see the benefits of the service, the user must register and provide a profile. Many users prefer to browse anonymously, and studies have shown that users have relatively short attention spans.

Prior art content location aids are typically server-based. For example, the eTour service requires the user to register with their server, and the user must visit the eTour site each time a user wishes to activate the service during a session. Other server-based aids have been provided in web sites which allow users to make purchases from an on-line catalog. For example, in some web sites, when a user identifies a particular item in the catalog of interest, then the server, when dynamically creating a web for the user, may identify other products in the catalogue which may be of interest to the user. Such server-based aids are limited, in that they only work with a single on-line catalogue, and require that the user remain in contact with the server. These server-based aids can be slow, both because of the demands placed upon the server, and the need to make repeated data transfers over the telecommunications infrastructure.

SUMMARY OF THE INVENTION

In accordance with the present invention, an electronic content recommendation service is provided which can act as an aid to a user in obtaining electronic content. The service is provided using software, apparatus and methods in accordance with the invention. The service may be operated without user profiles or user registration. However, the service nonetheless can provide highly useful recommendation for electronic content to browse.

In accordance with the invention, a user's browsing of electronic content is monitored. For each unit of electronic content output by the user's browser, one or more units of electronic content (e.g., web pages) are recommended to the user. The user may then load a recommended unit of electronic content.

Recommendation is based upon a system of categorization. A number of units of electronic content are identified as fitting into predefined categories of human interest. During a user's browsing, the unit of electronic content loaded in the user's browser is determined to be in at least one of the predefined categories. Recommendations of electronic content to browse are drawn from lists of units of electronic content which were previously placed into the category of the current unit of electronic content.

DESCRIPTION OF THE DRAWINGS

Further objects of this invention, together with additional features contributing thereto and advantages accruing therefrom, will be apparent from the following description of an embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the embodiments and examples shown should be considered as exemplars, rather than limitations on the apparatus and methods of the present invention.

THE SYSTEM AND APPARATUS OF THE INVENTION

Figure 1:
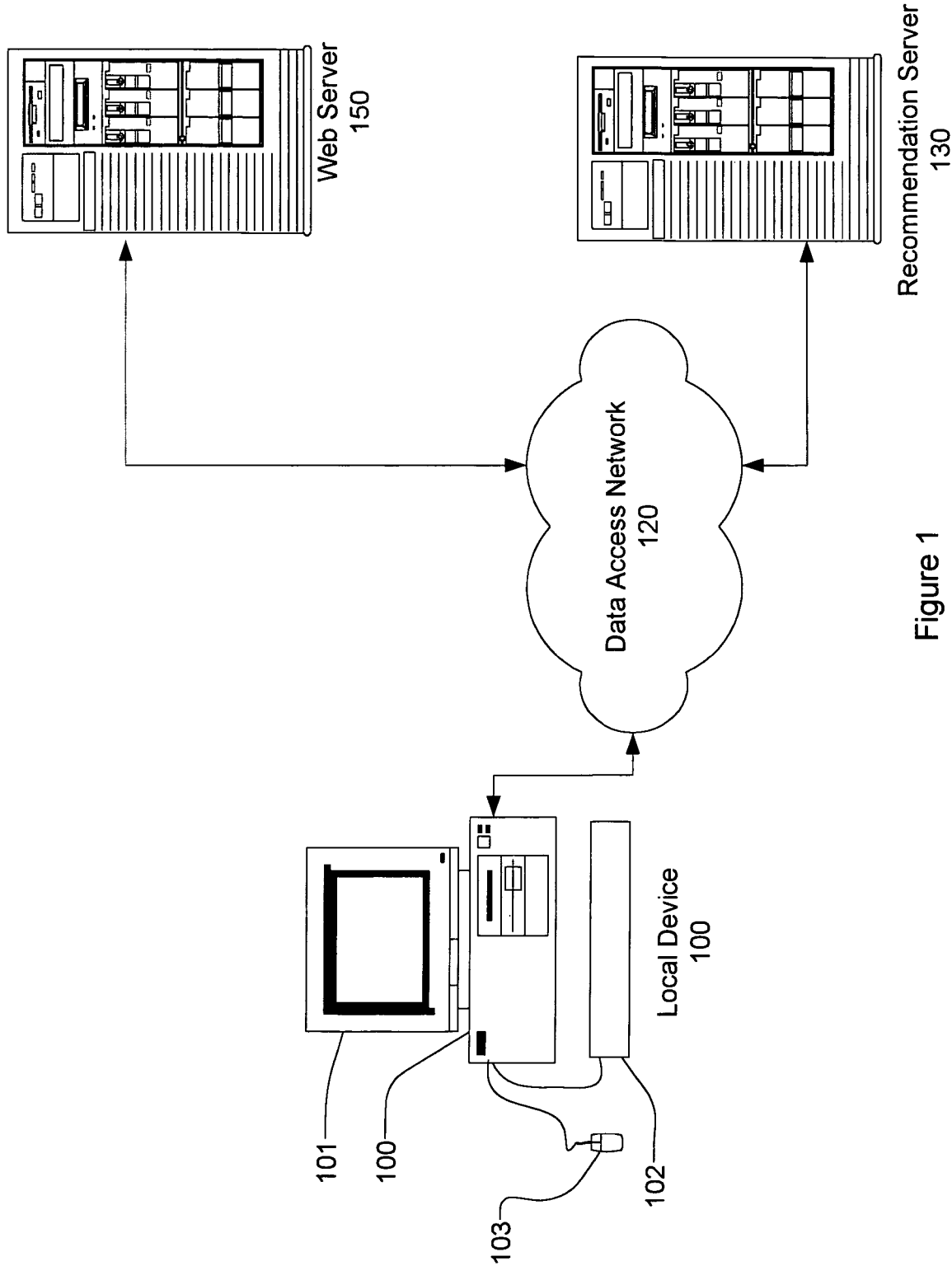
FIG. 1 is a first block diagram of a network data distribution system in accordance with the invention.

With reference to FIG. 1, there is shown a block diagram of a network data distribution system compatible with the invention. FIG. 1 includes a local device 100, a data access network 120, a recommendation server 130 and a web server 150.

The local device 100 may be a client computer that is configured to access the web server 150 and the recommendation server 130 via the data access network 120. The client computer may be, for example, a PC running a Microsoft Windows operating system. The local device 100 includes an output device, such as display 101, and an input device, such as keyboard 102 and/or pointing device 103 (e.g., mouse, track ball, light pen, or data glove). The local device 100 may also be, for example, an Internet appliance, network computer (NC), or a data-enabled device such as a portable digital assistant (PDA), mobile phone, refrigerator, automobile, etc. The particular type of device of the local device 100 is not considered to be important so long as the local device 100 can provide some measure of individual user interactivity with a source of electronic content via a data access network in a client/server fashion.

The data access network 120 provides lower layer network support for the local device 100 to interact with servers in the network data distribution system, including the recommendation server 130 and the web server 150. The data access network 120 may comprise a common or private bi-directional telecommunications network, a public switched telephone network (PSTN), a cable-based telecommunication network, a LAN, a WAN, a wireless network, any of which are coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages and electronic content available to the local device 100. Thus, for example, the web server 150 could be accessible from the Internet, or it could be a part of an intranet, and represents any number of servers.

The recommendation server 130 is a computer system, such as a server computer. The recommendation server 130 may be considered to represent a number of physical devices which as a group provide the indicated network services. For example, the recommendation server 130 could include a web server plus a database server. The recommendation server 130 transmits certain data to the local device 100 as described further below. The recommendation server 130 may also act as a recipient of certain information transmitted by the local device 100, as described further below.

Figure 2:
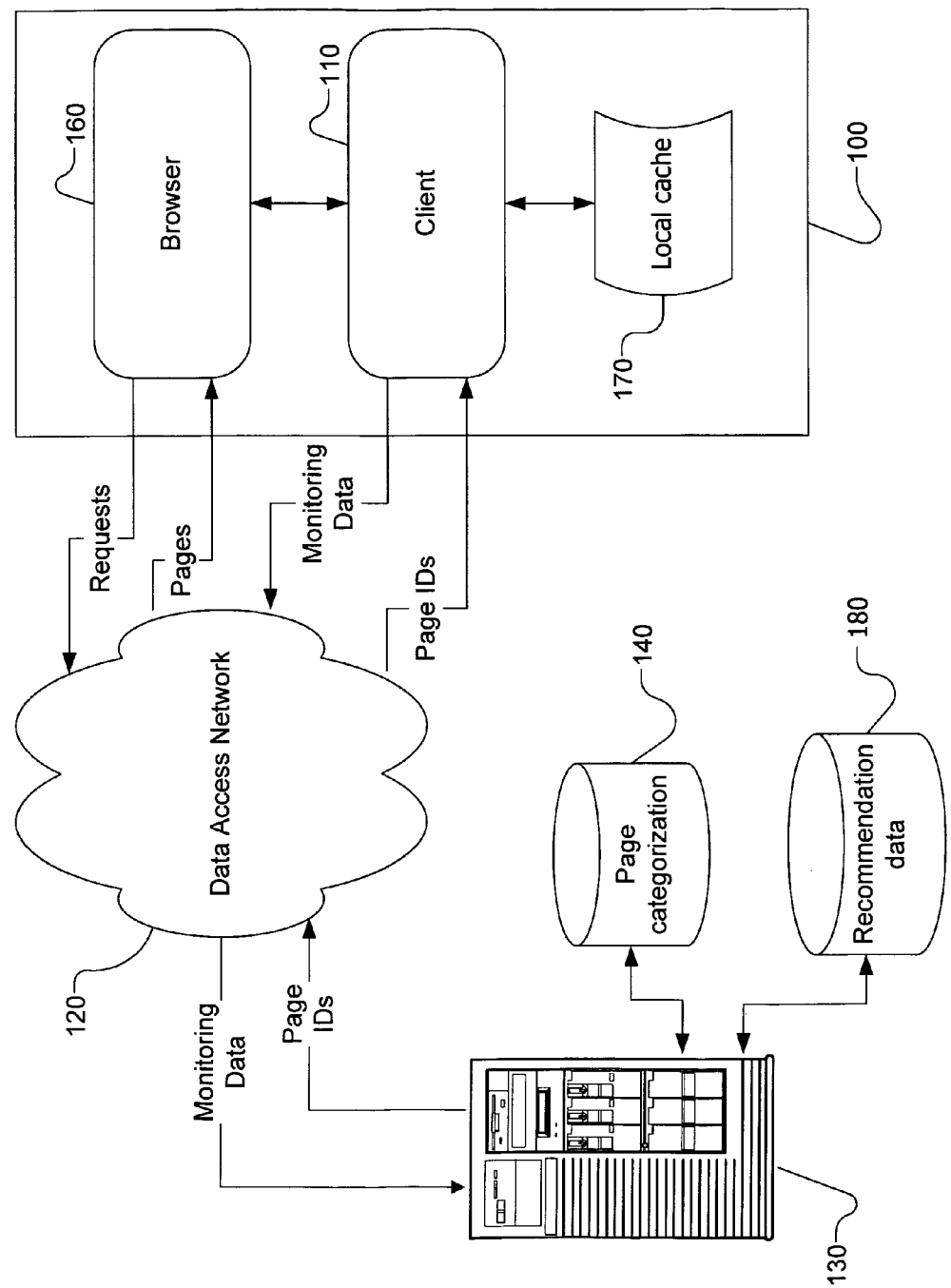
FIG. 2 is a second block diagram of the network data distribution system in accordance with the present invention.

Referring now to FIG. 2, there is shown a block diagram of another view of the network data distribution system of FIG. 1. The system comprises a client 110, the data access network 120, the recommendation server 130 a recommendation database 180 and a page categorization database 140.

A browser 160 is also shown. A "browser" is software that provides interactive utilization of units of electronic content, such as web pages. The browser 160 may be Microsoft Internet Explorer or Netscape Navigator. The browser 160 may alternatively be a microbrowser used to browse units of WML or HDML based electronic content on a wireless handset. When the local device 100 is connected to the web server 150 through the data access network 120, the user of the local device browses the web server 150 from the local device 100 using the browser 160. The browser 160 need not be stored on the local device 100. The user, from the local device 100, can exercise control over what electronic content is requested and thus output to the output device of the local device 100.

The client 110 is software operative on the local device 100. The client 110 may be an independent application program, a DLL or other logical grouping of routines. The client 110 need not be stored on the local device 100. The client 110 may be integrated with the browser 160, an operating system, or other software.

The recommendation database 180 and the page categorization database 140 store and provide data regarding categories, web pages and recommendations. The page categorization database 140 supports category look-up for electronic content. The recommendation database 180 supports category-based recommendations. Although described herein as separate entities, the recommendation database 180 and the page categorization database 140 may be combined into a single database with appropriate fields and controls, and may be otherwise distributed.

A copy or subset of the recommendation database 180 and the page categorization database 140, referred to as local cache 170, may also be stored in the local device 100 to speed the operation of the client 110. The client 110 and recommendation server 130 may cooperate to update the local cache 170, and to have the recommendation database 180 and the page categorization database 140 accessed when the local cache 170 is inadequate or unavailable. The decision on what, if anything, to place into the local cache 170 depends on such factors as the capabilities of the client 110, the recommendation server 130, the databases 140, 180, and the data access network 120. Decisions on what and how much to store in the local cache 170 may be influenced by factors such as popularity of an object to a particular user and popularity to all or a group of users.

One aspect of the present invention is the use of "categories." A category has two components. First, there is a label associated with the category which in most embodiments is descriptive of the category. Second, there is a scope for the category. The category scopes may be precisely defined, or may be loosely defined. The scopes may be defined through automated and/or manual techniques. Scopes may be defined using principles of linguistics and cognitive science. The particular labels and scopes, and the method of creating the labels and scopes, is not critical to the invention.

Furthermore, the labels and scopes to be used are generally dependant on the embodiment of the invention.

In general, the categories should be logically distinct, though some overlap may be inevitable. The categories should be of human interest, which is itself difficult to precisely define. Just as there are numerous techniques for selecting categories, so too there are numerous techniques for categorizing units of electronic content such as web pages, and for selecting which unit of electronic content to recommend for a given category. In the embodiment currently contemplated, formulation of the page categorization database 140 and the recommendation database 180 involves human input. In the embodiment currently contemplated, the page categorization database 140 comprises domain names and URLs which are selected based upon popularity. Objects (e.g., domain names and URLs which resolve to web pages) in the page categorization database 140 are categorized by parsing the HTML of the corresponding web page, distilling the text of the pages, and deriving a sense of the text of each page. The senses may be made using principles of linguistics and cognitive science. The senses are used to select one or more categories into which the web page fits. The list may include ratings of relevance of a given web page to its categories.

Figure 3:
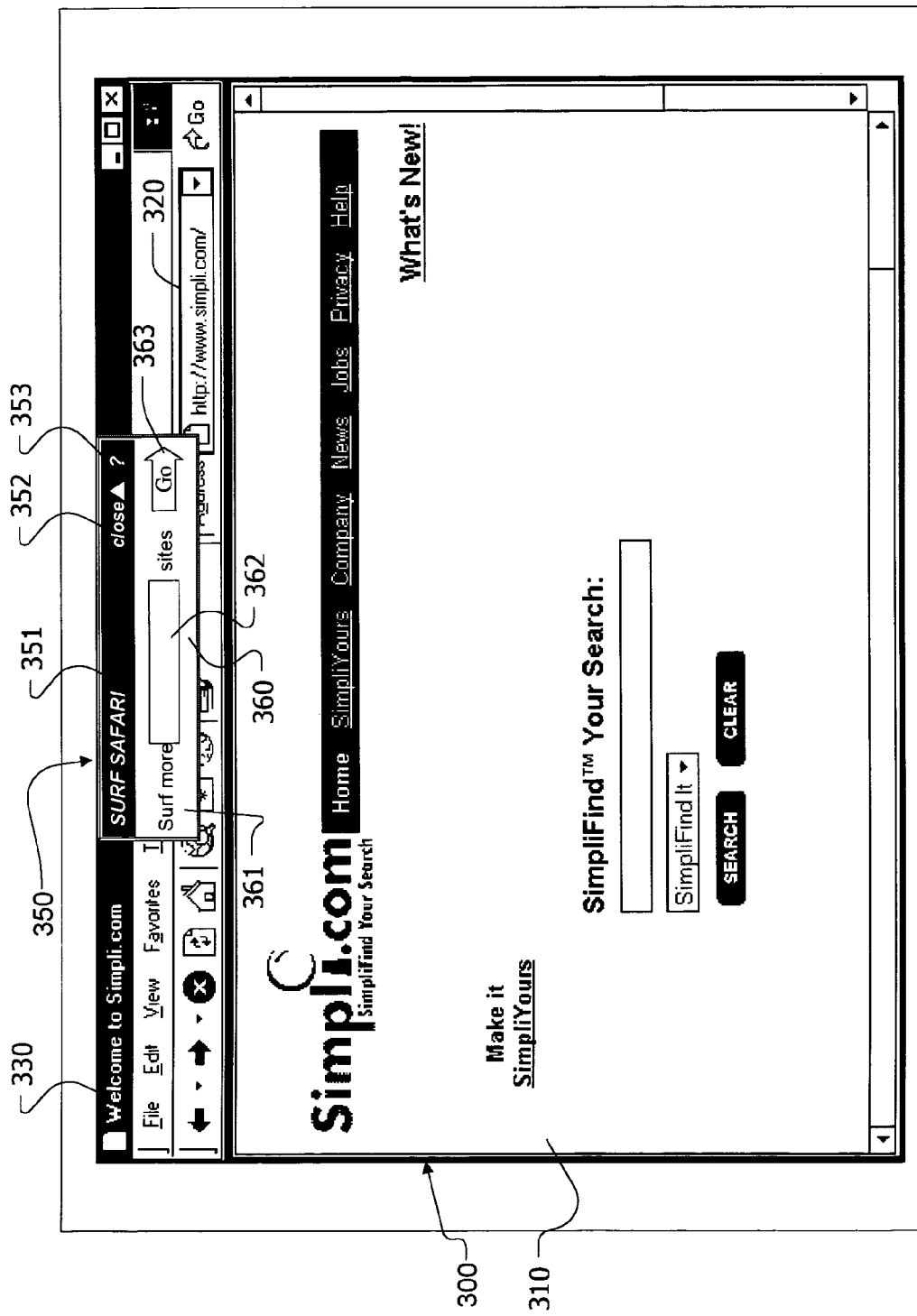
FIG. 3 is a representation of a display of a local device having a client window and a browser window in accordance with the invention.

Referring now to FIG. 3, there is shown the display 101 having a client window 350 and a browser window 300. The client window 200 is generated and controlled by the client 110. The browser window 300 is generated and controlled by the browser 160. The browser window 300 is familiar to those skilled in the art, so the particulars are not described further herein. Further information regarding the use of most browsers and their technical specifications is abundantly available.

The browser window 300 includes a display pane 310, an address bar 320 and a title bar 330. The display pane 310 is a region of the browser window 300 wherein the browser 160 causes web pages received by the browser 160 to be displayed. The address bar 320 is another region of the browser window 300. The browser 160 displays URLs in the address bar 320 corresponding to the web page currently displayed in the display pane 310. The user can also enter a URL into the address bar 320, and the browser 160 will attempt to load the web page or other object to which the entered URL points. The address bar 320 may be hidden. However, there is an object associated with the address bar which, in common practice, stores the URL for the currently displayed web page. The primary feature of the title bar 330 is that it displays the title of the browser 160. Another feature of most browsers is that the title bar 330 displays the title of the web page then displayed in the display pane 310.

The client window 350 includes a title bar 351 and a number of operational icons 352, 353 on the title bar 351. The title bar 351 may be used for identifying the client 110. The client window 350 as shown includes a recommendation pane 360. The recommendation pane 360 includes a prompt 361, a category display area 362 and an activation button 363. The client window 350 and the recommendation pane 360 are shown having a conventional rectangular shape. However, the client window 350 and the recommendation pane 360 may define any of a wide variety of regular or irregular shapes.

The client window 350 is displayed on top of the browser window 300. The client window 350 may be configured to attach to an edge of the browser window 300, and always remain visible and on top of the browser window 300 (persistent). The location of the client window 350 may be predefined, selectable by the user, or selected by a server remotely. In one embodiment, the client window 350 is attached to the title bar 330 of the browser window 300. In other embodiments, the client window 350, or parts of the client window 350, may be integrated into the browser window 300. For example, the title bar 351 of the client window 350 may be eliminated, and the contents of the recommendation pane 360 fixed in the browser window 300.

The operational icons 352, 353 on the title bar 351 include a close icon 352 and a help icon 353. Activation of the close icon 352 causes client 110 to close the recommendation pane 360, although the title bar 351 of the client window 350 remains displayed. The help icon 353 may be used for providing help to the user. The category display area 362 is used for displaying the label associated with the category of the web page being displayed in the browser display pane 310. The prompt 361 is static text which, when combined with the display in the category display area 362, conveys a message to the user of the availability of a recommendation. The activation button 363 is used by the user to accept the recommendation.

Variations of the client window 350, and corresponding functionality of the client 110 are within the scope of the invention. The category display area 362 may be a drop down list. In such an embodiment, the drop down list could include all of the categories in which the current web page falls, and could list sub-categories. The client window 350 may provide a selectable display of the URLs, page names, or site names of the recommended web pages.

THE METHODS OF THE INVENTION

Figure 4:
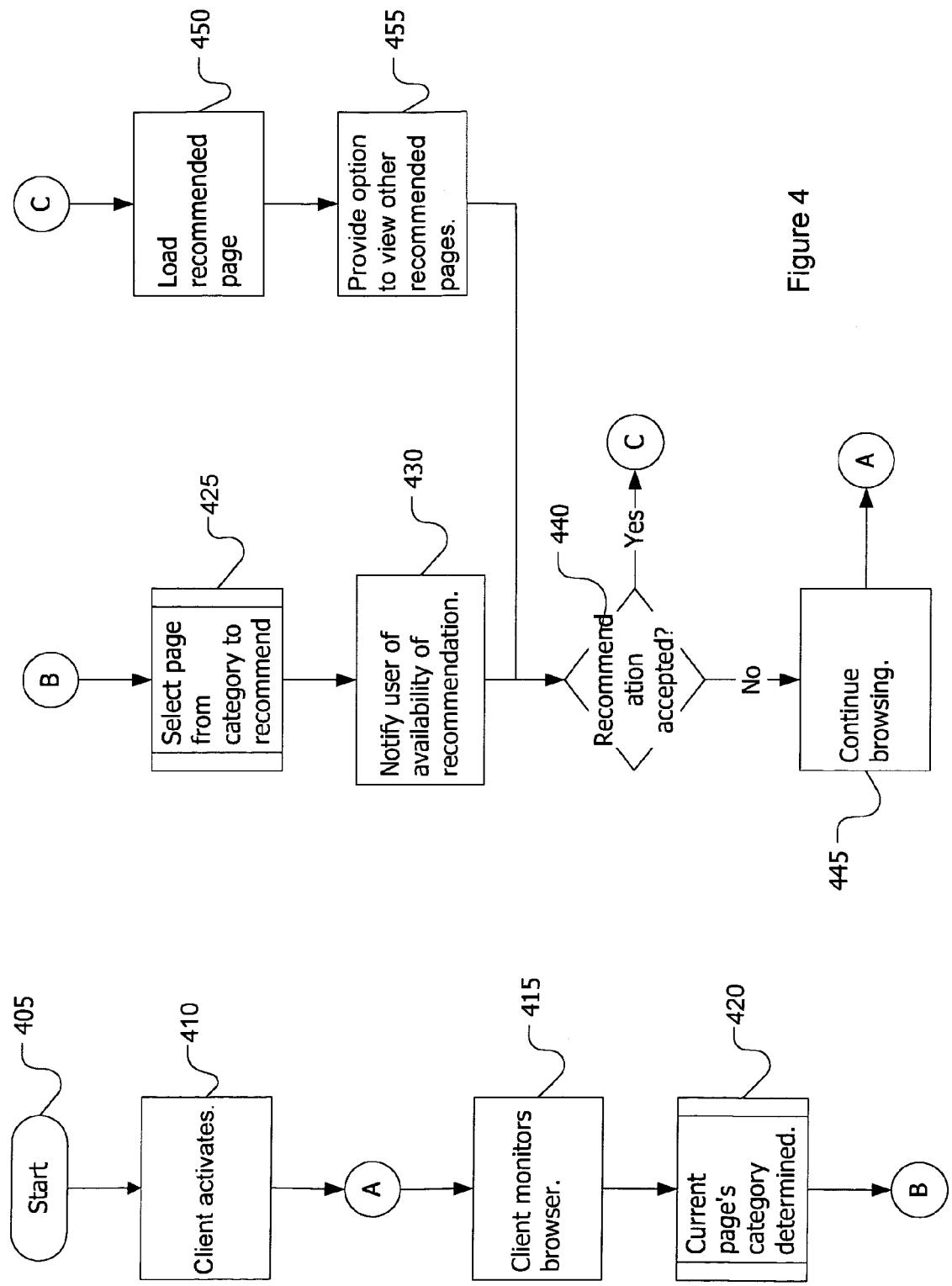
FIG. 4 is a flow chart of a method of recommending web pages to a user in accordance with the invention.

Referring now to FIG. 4, there is shown a flow chart of a method of recommending electronic content to a user in accordance with the invention. As will be seen, in contrast with prior art systems, this method may be practiced without any particular information about the user, such as a user profile. Because the method is automatic from a user perspective, a user need not register or provide information before gaining its benefits.

After the method begins (step 405), the client 110 activates on the local device 100. The client 110 may activate automatically, for example when the browser 160 activates (step 410). The process by which the client 110 is installed on the local device 100 is not significant. The client 110 may be provided to users for free or for a fee. The recommendation service of the invention may be provided for free or for a fee. Fees may be assessed through well known payment systems, including through artificial media of exchange such as RocketCash.

Once activated, the client 110 can monitor the browser 160 (step 415). One reason that the client 110 monitors the browser is to know when the user has browsed to a new web page. By monitoring the browser's address bar object, when the browser 160 requests a web page, the client 110 can recognizes that the address bar object has changed. This is only one of many techniques for the client 110 to learn that the current web page has changed.

If there is a new web page in the browser 160, then the category of the newly current web page is determined (step 420). The address bar object stores the URL of the current web page. By copying the contents of the address bar object, the client 110 can use the URL of the current web page as a basis for determining the category of the current web page.

As explained above, the recommendation server 130 has access to the page categorization database 140, which can be copied to the local device 100 and accessed directly by the client 110. Depending on the location and distribution of the page categorization database (stored in the local cache 170 or the full copy 140), the URL from the address bar object may be used to obtain the corresponding category from the categorization database. This may also depend on whether the categorization database 140 stores complete URLs, portions such as domain names, keywords, etc.

Categorization of the current web page may be done "on the fly." For example, the same techniques discussed above for batch categorization to create the page categorization database 140 may be used on an as-needed basis during browsing. A look-up table may be useful in any event to correlate between categories and characteristics of web pages.

Although the category determination can be made by initially copying the URL from the address bar object, other techniques can be used to determine the category of the current web page. For example, techniques such as screen-scraping, data-stream sniffing, and copying other objects used by the browser are available to obtain information about the current web page. This information may be used as described above for categorization.

Once the category of the current web page is known, the client 110 can select a web page to recommend (step 425). There may be only one web page recommended, or a number of web pages may be selected to recommend. The recommendation is automatic (i.e., active), and does not require the user to do anything to obtain the recommendations. Furthermore, recommendations may be made without reference to user profiles of any kind.

To make a recommendation, the client 110 consults the recommendation data in the local cache 170, in the recommendation database 180, or may cooperate with the recommendation server 130 to access the recommendation database 180. In the embodiment currently contemplated, web pages to recommend for each category are selected in advance. This includes some measure of human involvement to refine the recommendations. When needed by the client 110, recommendations may be made in a way that minimizes the chance that a commendation is made twice. Recommendations may also be made on a preferential basis, and may be made on exchange of consideration (e.g., paid placement). Recommendations can also be made on numerous other factors, including popularity, fit in a category, and relationships.

Furthermore, recommendations can be made by synthesizing characteristics from a user's historical web browsing. Since the client 110 monitors web browsing, a history of web pages browsed may be maintained and utilized to enhance the recommendations. For example, it may be desirable to not recommend pages which the user has already browsed, which the user has browsed them within a certain period of time, or which are similar to pages the user has browsed or recently browsed.

It is believed that, for the client 110 to be effective, its use should instill trust in the user. This theory is drawn from the experience of prior art search engines. Thus, although short-term revenues may be enhanced by accepting paid placements which are not particularly relevant to a category, this may ultimately reduce usage of the client 110 because of reduced user trust.

After the client 110 has obtained one or more recommendations for the current web page (step 425), the client 110 generates a message on the output device 101 which informs the user of the availability of a recommendation (step 430). This may be achieved by displaying the category of the current web page in the category display area 362 (FIG. 3), and displaying the activation icon 363. The display of the category in the category display area 362 may occur after the category of the current web page has been determined in step 420, after the recommendation(s) are available in step 425.

The user then may provide input to the client 110 indicative of the user's desire to activate the recommendation (step 440). If there is more than one recommendation, the activation icon 363 may be used to select the first recommended web page. The user may be provided with the opportunity to select from a list of recommended web pages, for example with a drop down list. If the user chooses not to accept the recommendation, then browsing continues (step 445), and the client 110 continues to monitor the browser (step 415).

As an alternative to step 440 following step 425, they may be reversed. That is, the user may provide input to the client 110 indicative of the user's desire to activate a recommendation, and then the recommendation may be obtained.

If the user accepts a recommendation, then the client 110 causes the browser 160 to request the recommended web page (step 450). If the user could select from more than one recommendation, then the client 110 causes the browser 160 to request the recommended web page which the user selected. The web browser then requests and loads the recommended web page. The recommended web page may be displayed in the same browser window 300 as the current web page, or may be displayed in a new or other window.

After the user has selected a first recommended web page (step 440), the user may continue to accept recommendations from the same category (step 455). This step 455 may be performed in a number of ways. As mentioned, in step 425 several web pages may be selected for recommendation. In such a case, the client 110 maintains a list of recommendations and the user may select a next recommendation by activating the activation icon 363. The activation icon 363 may change appearance to reflect that more recommendations are available. As an alternative to selecting multiple web pages to recommend in step 425, after a recommended web page has been loaded, it can be treated as the current web page, with control returning to step 415. By providing successive recommendations, the user may be provided with an electronic tour of web pages which are likely to be of interest.

In the currently contemplated embodiment, the client 110 continues operating so long as the browser 160 is active. Thus, the client window 350 is never completely closed. Since the client window 350 may be embodied in other forms, or eliminated as described above, manners of hiding operative features of the client 110 or closing the client 110 are within the scope of the invention.

The client 110 may provide additional avenues for making recommendations of web pages to the user. The user may be prompted to enter or select one or more key words, categories or linguistic senses, provided as a whole or limited by relevant criteria as discussed above. Recommendations may then be made from the user input alone or in conjunction with analysis of the current web page.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of recommending web pages comprising the steps of:

providing plural categories of human interest, the categories having associated therewith respective scopes activating a client on a local device, the local device having an input device, an output device and a web browser the client monitoring browsing activity of an unregistered user who has not entered a profile of any kind the web browser requesting a first web page in response to the web browser requesting the first web page, the client automatically obtaining a first one of the plural categories of human interest in which the first web page belongs after the first one of the plural categories of human interest is obtained, the client automatically obtaining a first recommendation of a second web page which is in the first one of the plural categories of human interest wherein the first recommendation is based on the first one of the plural categories of human interest and not on a user profile of any kind, any particular information about the unregistered user, or any past browsing activity of the unregistered user while the web browser displays the first web page, the client outputting a message to the output device which informs the unregistered user of the availability of the first recommendation the unregistered user providing input to the client indicative of the unregistered user's desire to activate the first recommendation, and in response the client causing the web browser to request the second web page the web browser requesting the second web page the web browser outputting the second web page to the output device.

2. The method of recommending web pages to an unregistered user of claim 1 wherein the step of the client obtaining the first recommendation is performed after the step of the unregistered user providing input.

3. The method of recommending web pages to an unregistered user of claim 1 wherein the client is an independent program.

4. The method of recommending web pages to an unregistered user of claim 1 wherein the step of automatic obtaining first one of the plural categories of human interest in which the first web page belongs is performed by the steps of:

providing a page categorization database comprising identifiers of web pages correlated to the plural categories of human interest looking up the first web page in the page categorization database to thereby obtain a first one of the categories of human interest corresponding to the first web page.

5. The method of recommending web pages to an unregistered user of claim 4 further comprising the steps of:

the web browser storing a first resource locator corresponding to the first web page into an address bar object the client copying the first resource locator from the address bar object and using the first resource locator for looking up the first web page in the correlation table.

6. The method of recommending web pages to an unregistered user of claim 5 wherein the first resource locator comprises a uniform resource locator.

7. The method of recommending web pages to an unregistered user of claim 1 further comprising the step of providing the unregistered user with the option to access a next recommended web page.

8. The method of recommending web pages to an unregistered user of claim 1 wherein the output device comprises a display, and the web browser outputs web pages on the display.

9. The method of recommending web pages to an unregistered user of claim 1 further comprising the steps of:

the client automatically obtaining a second recommendation of a third web page which is in the first one of the plural categories of human interest after the step of the web browser outputting the second web page to the output device, the unregistered user providing input to the client indicative of the unregistered_user's desire to activate the second recommendation, and in response the client causing the web browser to request the third web page the web browser outputting the third web page to the output device.

10. The method of recommending web pages to an unregistered user of claim 1 wherein the recommendation is provided to the unregistered_user for free.

11. The method of recommending web pages to an unregistered user of claim 1 further comprising, after the step of the unregistered_user providing input, assessing a charge against an account for making the first recommendation.

12. A computer-readable medium comprising a set of instructions for causing a computer to:

monitor a browser on the computer and determine that the browser has requested a first web page in response to the computer determining that the browser has requested a first web page, automatically obtain a first one of the plural categories of human interest in which the first web page belongs automatically obtain a first recommendation of a second web page which is in the first one of the plural categories of human interest while the browser displays the first web page, output a message to the output device which informs an unregistered user who has not entered a profile of any kind of the availability of the first recommendation wherein the first recommendation is based on the first one of the plural categories of human interest and not on a user profile of any kind, any particular information about the unregistered user, or any past browsing activity of the unregistered user accepting a first unregistered user input which shows the unregistered user's desire to activate the first recommendation, cause the browser to request the second web page.

13. The computer-readable medium of claim 12 wherein the first recommendation is obtained after the unregistered user input is accepted.

14. The computer-readable medium of claim 12 further comprising instructions for causing the computer to determine the first one of the plural categories of human interest in which the first web page belongs.

15. The computer-readable medium of claim 12 wherein the instructions for causing the computer to automatically obtain a first one of the plural categories of human interest in which the first web page belongs include instructions for causing the computer to look up the first web page in a page categorization database comprising identifiers of web pages correlated to the plural categories of human interest to thereby determine the first one of the categories of human interest corresponding to the first web page.

16. The computer-readable medium of claim 15 further comprising instructions for causing the computer to copy a first resource locator from an address bar object of the browser and use the first resource locator for looking up the first web page in the page categorization database.

17. The computer-readable medium of claim 12 further comprising instructions for causing the computer to provide the unregistered user with the option to access a next recommended web page.

18. The computer-readable medium of claim 12 further comprising instructions for causing the computer to:
   automatically obtain a second recommendation of a third web page which is in the first one of the plural categories of human interest
   accept a second unregistered user input which shows the unregistered user's desire to activate the second recommendation
   cause the browser to request the third web page.

19. The computer-readable medium of claim 12 further comprising instructions for causing the computer to assess a charge against an account for making the first recommendation.

20. A local device for browsing units of electronic content in conjunction with plural categories, the local device comprising:
   an input device
   an output device
   a browser for requesting units of electronic content and for outputting the units of electronic content to the output device
   a client for recommending units of electronic content to an unregistered user of the local device, wherein the unregistered user is a user who has not entered a profile of any kind, the client including instructions to
   monitor the browser and determine that the browser has requested a first unit of electronic content
   in response to the determination that the browser has requested a first unit of electronic content, automatically obtain a first one of the plural categories in which the first unit of electronic content belongs
   automatically obtain a first recommendation of a second unit of electronic content which is in the first one of the plural categories
   wherein the first recommendation is based on the first one of the plural categories and not on a user profile of any kind, any particular information about the unregistered user, or any past browsing activity of the unregistered user
   while the browser displays the first unit of electronic content, output a message to the output device which informs the unregistered user of the availability of the first recommendation
   accept a first unregistered user input which shows the unregistered user's desire to activate the first recommendation,
   cause the browser to request the second unit of electronic content.

21. The local device for browsing units of electronic content in conjunction with plural categories of claim 20 wherein the first recommendation is obtained after the unregistered user input is accepted.

22. The local device for browsing units of electronic content in conjunction with plural categories of claim 20, the client further comprising instructions to determine the first one of the plural categories in which the first unit of electronic content belongs.

23. The local device for browsing units of electronic content in conjunction with plural categories of claim 20 wherein the instructions to automatically obtain a first one of the plural categories in which the first web page belongs include instructions to look up the first unit of electronic content in a categorization database comprising identifiers of web pages correlated to the plural categories to thereby determine the first one of the categories corresponding to the first unit of electronic content.

24. The local device for browsing units of electronic content in conjunction with plural categories of claim 20, the client further comprising instructions to copy a first resource locator from an address bar object of the browser and use the first resource locator to look up the first unit of electronic content in the categorization database.

25. The local device for browsing units of electronic content in conjunction with plural categories of claim 20, the client further comprising instructions to provide the unregistered user with the option to access a next recommended web page.

26. The local device for browsing units of electronic content in conjunction with plural categories of claim 20, the client further comprising instructions to:
   automatically obtain a second recommendation of a third unit of electronic content which is in the first one of the plural categories
   accept a second unregistered user input which shows the unregistered_user's desire to activate the second recommendation,
   cause the browser to request the third unit of electronic content.

27. The local device for browsing units of electronic content in conjunction with plural categories of claim 20 further comprising instructions for causing the computer to assess a charge against an account for making the first recommendation.

28. A method of recommending electronic content comprising the steps of:
   providing plural categories
   activating a client on a local device, the local device having an input device, an output device and a browser
   the client monitoring browsing activity of an unregistered user, wherein the unregistered user is a user who has not entered a profile of any kind
   the browser requesting a first unit of electronic content
   in response to the browser requesting the first unit of electronic content, the client automatically obtaining a first one of the plural categories of human interest in which the first unit of electronic content belongs
   after the first one of the plural categories is obtained, the client automatically obtaining a first recommendation of a second unit of electronic content which is in the first one of the plural categories
   wherein the first recommendation is based on the first one of the plural categories of human interest and not on a user profile of any kind, any particular information about the unregistered user, or any past browsing activity of the unregistered user
   while the web browser displays the first web page, the client generating a message on the output device which informs the unregistered user of the availability of the first recommendation
   the unregistered user providing input to the client indicative of the unregistered user's desire to activate the first recommendation
   the browser outputting the second unit of electronic content to the output device.

29. The method of recommending electronic content to an unregistered user of claim 28 wherein the step of the client obtaining the first recommendation is performed after the step of the unregistered user providing input.

30. The method of recommending electronic content to an unregistered user of claim 28 wherein the client determines the first one of the plural categories in which the first unit of electronic content belongs.

31. The method of recommending electronic content to an unregistered user of claim 28 wherein the client is an independent program.

32. The method of recommending electronic content to an unregistered user of claim 28 wherein the step of automatic obtaining first one of the plural categories in which the first unit of electronic content belongs is performed by the steps of:
- providing a categorization database comprising identifiers of unit of electronic content correlated to the plural categories
- looking up the first unit of electronic content in the categorization database to thereby obtain_a first one of the categories corresponding to the first unit of electronic content.

33. The method of recommending electronic content to an unregistered user of claim 28 further comprising the step of providing the unregistered user with the option to access a next recommended unit of electronic content.

34. The method of recommending electronic content to an unregistered user of claim 28 wherein the output device comprises a display, and the web browser outputs unit of electronic content on the display.

35. The method of recommending electronic content to an unregistered user of claim 28 further comprising the steps of:
- the client automatically obtaining a second recommendation of a third unit of electronic content which is in the first one of the plural categories
- after the step of the browser outputting the second unit of electronic content to the output device, the unregistered user providing input to the client indicative of the unregistered_user's desire to activate the second recommendation, and in response the client causing the browser to request the third unit of electronic content
- the browser outputting the third unit of electronic content to the output device.

36. The method of recommending electronic content to an unregistered user of claim 28 wherein the recommendation is provided to the unregistered_user for free.

37. The method of recommending electronic content to an unregistered user of claim 28 further comprising, after the step of the unregistered user providing input, assessing a charge against an account for making the first recommendation.

* * * * *